United States Patent
Brailovskiy et al.

(10) Patent No.: US 12,041,303 B1
(45) Date of Patent: Jul. 16, 2024

(54) BANDWIDTH ESTIMATION FOR VIDEO ENCODING

(71) Applicant: Amazon Technologies, Inc., Seattle, WA (US)

(72) Inventors: Ilya Vladimirovich Brailovskiy, Los Gatos, CA (US); Alessio Carosi, Waterbeach (GB); Ulises Brindis, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 468 days.

(21) Appl. No.: 15/925,498

(22) Filed: Mar. 19, 2018

(51) Int. Cl.
| | |
|---|---|
| H04W 24/00 | (2009.01) |
| H04L 43/0829 | (2022.01) |
| H04L 47/25 | (2022.01) |
| H04N 19/166 | (2014.01) |
| H04N 21/24 | (2011.01) |
| H04N 21/442 | (2011.01) |
| H04L 43/0882 | (2022.01) |

(52) U.S. Cl.
CPC ... *H04N 21/44209* (2013.01); *H04L 43/0829* (2013.01); *H04L 47/25* (2013.01); *H04N 19/166* (2014.11); *H04N 21/2402* (2013.01); H04L 43/0882 (2013.01)

(58) Field of Classification Search
CPC . H04L 41/0806; H04L 41/0846; H04L 67/34; H04L 67/12; H04L 69/04; H04L 67/2828; H04W 4/06; G05B 19/4188
See application file for complete search history.

(56) References Cited

U.S. PATENT DOCUMENTS

| | | | | |
|---|---|---|---|---|
| 5,870,666 A | * | 2/1999 | Tanaka | H04W 72/542 |
| | | | | 455/67.11 |
| 6,366,959 B1 | * | 4/2002 | Sidhu | H04L 65/80 |
| | | | | 709/214 |
| 6,487,603 B1 | * | 11/2002 | Schuster | H04L 65/764 |
| | | | | 711/170 |

(Continued)

OTHER PUBLICATIONS

Winstein et al.; Stochastic Forecasts Achieve High Throughput and Low Delay over Cellular Networks; 10th USENIX Symposium on Networked Systems Design and Implementation; USENIX Association; Apr. 2, 2013; pp. 459-471.

(Continued)

*Primary Examiner* — Nicholas P Celani
*Assistant Examiner* — Wuji Chen
(74) *Attorney, Agent, or Firm* — K&L Gates LLP

(57) ABSTRACT

Techniques are generally described for remote estimation of bandwidth. In various examples, a video stream may be received at a first bit rate over a first communication channel. A first value of a network condition of the video stream may be determined over a first time period. A determination may be made that the first value is less than a threshold value. A first bandwidth estimate of the communication channel may be determined. The first bandwidth estimate may comprise the first bit rate reduced by a first percentage. A second value of the network condition may be determined over a second time period. A determination may be made that the second value is greater than the threshold value. A second bandwidth estimate of the communication channel may be determined. The second bandwidth estimate may be less than the first bandwidth estimate.

19 Claims, 7 Drawing Sheets

(56) References Cited

U.S. PATENT DOCUMENTS

| | | | |
|---|---|---|---|
| 6,973,059 B1* | 12/2005 | Borst | H04B 1/715 370/347 |
| 7,359,337 B2* | 4/2008 | Fukuda | H04L 1/205 370/231 |
| 9,871,606 B1* | 1/2018 | Carroll | H04H 60/56 |
| 10,374,928 B1* | 8/2019 | Kalman | G06T 15/04 |
| 10,498,660 B2* | 12/2019 | Giles | H04L 47/28 |
| 2002/0010938 A1* | 1/2002 | Zhang | H04N 21/2662 375/E7.005 |
| 2003/0016630 A1* | 1/2003 | Vega-Garcia | H04L 65/80 370/252 |
| 2003/0067872 A1* | 4/2003 | Harrell | H04L 65/752 370/477 |
| 2003/0135631 A1* | 7/2003 | Li | H04L 65/752 709/231 |
| 2004/0151123 A1* | 8/2004 | Lau | H04L 69/323 370/252 |
| 2004/0252701 A1* | 12/2004 | Anandakumar | H04L 65/80 370/395.21 |
| 2005/0071876 A1* | 3/2005 | van Beek | H04N 19/172 375/E7.181 |
| 2005/0152397 A1* | 7/2005 | Bai | H04N 21/44209 370/395.2 |
| 2005/0172028 A1* | 8/2005 | Nilsson | H04N 21/44016 375/E7.014 |
| 2005/0188407 A1* | 8/2005 | van Beek | H04N 21/658 725/81 |
| 2005/0243729 A1* | 11/2005 | Jorgenson | H04L 43/16 370/235 |
| 2006/0029037 A1* | 2/2006 | Chen | H04L 47/70 370/351 |
| 2006/0094436 A1* | 5/2006 | Kim | H04W 72/085 455/450 |
| 2006/0095942 A1* | 5/2006 | van Beek | H04N 19/149 375/E7.129 |
| 2006/0095944 A1* | 5/2006 | Demircin | H04N 19/152 725/81 |
| 2006/0218264 A1* | 9/2006 | Ogawa | H04L 69/163 709/223 |
| 2006/0227250 A1* | 10/2006 | Barbieri | H04N 5/147 348/700 |
| 2007/0177598 A1* | 8/2007 | Miyazaki | H04L 43/0811 370/392 |
| 2008/0104231 A1* | 5/2008 | Dey | H04L 43/106 709/224 |
| 2009/0140026 A1* | 6/2009 | Okauchi | B23K 20/123 228/2.1 |
| 2009/0161569 A1* | 6/2009 | Corlett | H04L 43/0858 370/252 |
| 2009/0222553 A1* | 9/2009 | Qian | H04L 43/00 709/224 |
| 2010/0166058 A1* | 7/2010 | Perlman | H04N 21/2381 375/E7.126 |
| 2010/0226262 A1* | 9/2010 | Liu | H04N 21/2402 370/312 |
| 2010/0296000 A1* | 11/2010 | Henocq | H04N 19/70 348/E5.093 |
| 2010/0306373 A1* | 12/2010 | Wormley | H04L 67/1002 709/224 |
| 2011/0057838 A1* | 3/2011 | Melconian | H01Q 3/08 342/359 |
| 2011/0153816 A1* | 6/2011 | Lloyd | H04L 47/38 709/224 |
| 2012/0128002 A1* | 5/2012 | Muramoto | H04W 40/02 370/392 |
| 2012/0163221 A1* | 6/2012 | Miyazawa | H04L 43/0882 370/252 |
| 2012/0236740 A1* | 9/2012 | Dhanapal | H04L 43/50 370/252 |
| 2012/0324123 A1* | 12/2012 | Fox | G06F 15/781 709/231 |
| 2013/0003800 A1* | 1/2013 | Finkelstein | H04N 21/23655 375/224 |
| 2013/0114421 A1* | 5/2013 | Qian | H04L 43/0852 370/252 |
| 2013/0121181 A1* | 5/2013 | Kikuzuki | H04L 1/20 370/252 |
| 2013/0286837 A1* | 10/2013 | Khanchi | H04L 47/11 370/235 |
| 2014/0040495 A1* | 2/2014 | Vishwanath Kamath | H04N 21/6379 709/231 |
| 2014/0072032 A1* | 3/2014 | Melnyk | H04L 47/32 375/240.02 |
| 2014/0153419 A1* | 6/2014 | Beattie, Jr. | H04L 43/0829 370/252 |
| 2014/0254613 A1* | 9/2014 | Lloyd | H04L 47/38 370/477 |
| 2015/0179003 A1* | 6/2015 | Cooper | B61L 23/042 701/31.4 |
| 2015/0244479 A1* | 8/2015 | Lee | H04W 52/0245 370/252 |
| 2015/0257035 A1* | 9/2015 | Grinshpun | H04W 28/0284 370/235 |
| 2015/0355927 A1* | 12/2015 | Budzinski | G06F 9/45558 718/1 |
| 2017/0085420 A1* | 3/2017 | Singh | H04L 12/28 |
| 2017/0187651 A1* | 6/2017 | Yang | H04L 49/552 |
| 2017/0195235 A1* | 7/2017 | Giles | H04L 47/225 |
| 2019/0132229 A1* | 5/2019 | McCormack | H04L 63/00 |
| 2019/0200013 A1* | 6/2019 | Wu | H04N 19/152 |
| 2019/0261007 A1* | 8/2019 | Emmanuel | H04W 52/0261 |
| 2020/0014619 A1* | 1/2020 | Shelar | H04L 43/087 |
| 2020/0406910 A1* | 12/2020 | Ruan | H04L 69/22 |
| 2021/0235293 A1* | 7/2021 | Chen | H04W 16/18 |

OTHER PUBLICATIONS

Holmer et al.; A Google Congestion Control Algorithm for Real-Time Communication; Internet Draft; Jul. 8, 2016; 20 pgs.
Garcia; Bandwidth Estimation in WebRTC (and the new Sender Side BWE); Real Time Communications Bits; Jan. 30, 2017; 6 pgs.

* cited by examiner

US 12,041,303 B1

BANDWIDTH ESTIMATION FOR VIDEO ENCODING

BACKGROUND

Video and/or other media may be streamed between computing devices over a network. The encoded video data may pass through multiple network components as it travels from the first device to the second. However, network conditions can change during transmission of the encoded video data for various reasons, and network conditions may sometimes deteriorate to a level that causes delays in the transmission of the encoded video. Technologies exist for dealing with changes in network conditions when transmitting data, but because these network condition changes may originate from a variety of sources, these technologies may not provide optimal solutions for every type of situation.

DETAILED DESCRIPTION

Figure 1:
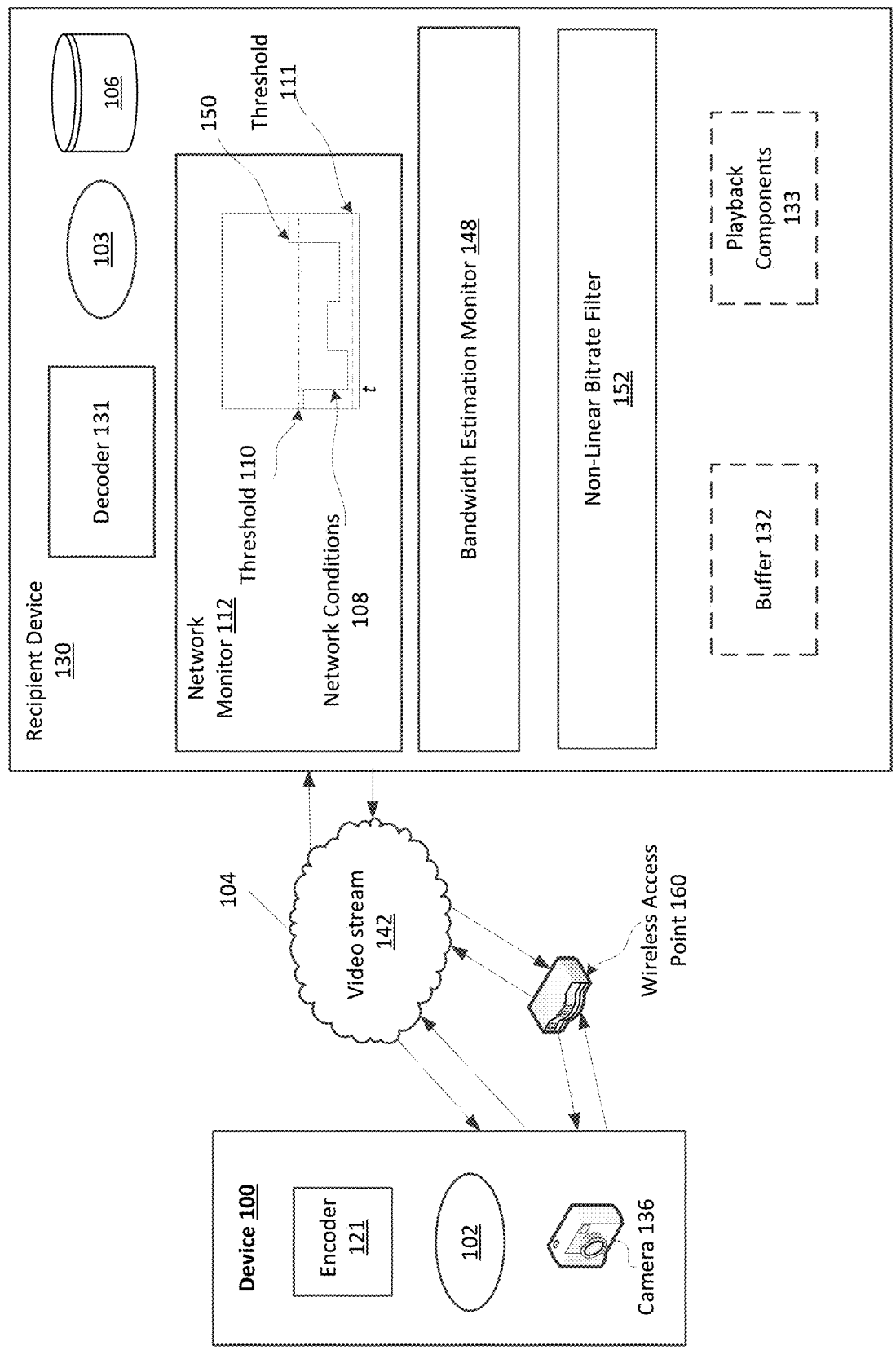
FIG. 1 depicts a system for performing bandwidth estimation for video encoding, in accordance with various embodiments of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In some examples, video data may be encoded by a first computing device and then sent to a second computing device, which decodes the video data while subsequent portions of the video are still being transmitted to the second computing device. Such video transmission and playback is often referred to as "streaming". In some other examples, videos and/or other media may be encoded by a first computing device and sent to one or more remote computing devices for further processing. Video may be encoded with various transmission attributes (e.g., bit rates, resolutions, profiles, frame rates, etc.) prior to sending the video over a network to a remote computing device. Web Real-Time Communication ("WebRTC") comprises a number of communication protocols and application programming interfaces ("APIs") that enable real time communication over peer-to-peer connections. WebRTC may use Real-time Transport Control Protocol ("RTCP") to transmit audio and/or video over a network.

In a WebRTC a sending device sends packets of encoded video that may be received and decoded by a recipient device. The packets of encoded video may be encoded based on current network conditions at the time of the encoding. For example, an encoder of the sending device may encode a video stream at a first bit rate based on current network conditions. Thereafter, network conditions may deteriorate due to increased network traffic and congestion. Accordingly, the end-to-end time between sending a packet of the video by the sending device and receipt of the packet by the recipient device may increase (e.g., the latency may increase). In response to the slowed network conditions, the recipient device may send a Receiver Estimated Maximum Bit rate ("REMB") message. The REMB message may include a field to convey the total estimated available bit rate on the network path to the receiving side of the real-time transport protocol ("RTP") session (e.g., the connection between the sending device and the recipient device). The sending/encoding device may use the bit rate specified in the REMB message to configure the maximum bit rate of the video encoding.

Such a scenario typically works well when there is a gradual change in network quality (e.g., a gradual change in bandwidth). However, WebRTC and other real-time multimedia communication over the Internet is subject to the unpredictability of the best-effort IP network. Packet loss, packet re-ordering, and variable queuing delay can cause erratic delays in the network path between sender and recipient. Additionally, wireless internet connections may be prone to bursty losses, interference and congestion. Further, in wireless connections, decreased bandwidth, connectivity issues, and/or increased packet loss may be experienced based on the distance between a device and the wireless access point as well as based on interference in the wireless signal. Additionally, buffer-bloat and drop-tail queues in routers or other access points can cause long delays and bursty losses.

Further, in some examples, a recipient device may send an REMB message conveying a reduced bandwidth estimate based on a simple and/or static scene (e.g., a scene without motion where the image data does not change or changes by a small amount from frame-to-frame). However, the amount of available bandwidth may be unchanged. Accordingly, video quality may suffer because the recipient device has inaccurately estimated that the available bandwidth has declined when, in reality, the bit rate has declined on the encoder side due to the relative simplicity of the scene.

Additionally, in some examples, modifying a bandwidth estimate based on simple thresholding of percentage of packets lost (and/or based on other indicators of current network conditions described herein) may result in needless loss of video quality and/or increased delay and/or jitter. Take, for example, a system that sets the bandwidth estimate at a minimum value (e.g., 150 kbps, 300 kbps, etc.) when the percentage of packets lost rises above 1%. Due to unpredictable network conditions, the percentage of packets lost may rise above 1% for only a short period of time (e.g., for <1 second) and the network conditions may thereafter recover with the percentage of packets lost falling to 0.2%. If a recipient device generates an REMB message specifying the minimum bit rate using the simple 1% packet loss threshold, the video quality may suffer as the encoder/sender device may begin encoding the video at a lower bit rate even though the lower bandwidth conditions on the network existed for only a short period of time. Conversely, if simple thresholding is used to increase the bandwidth estimate, the recipient device may specify (in an REMB message) an increase in bandwidth the moment that the percentage of packets lost falls below a packet loss threshold. As a consequence, the encoder may begin encoding image frames of video at a higher bit rate in accordance with the specified increase in estimated bandwidth. Thereafter, network conditions may deteriorate which may result in delays and/or further packet loss. Accordingly, various embodiments described below may offer improvements that may be used to estimate available bandwidth with logic to avoid reactive and drastic changes in bandwidth estimation. Additionally, various techniques described herein are effective to monitor various network parameters to mitigate packet loss, frame drops, and/or latency while maximizing video quality in accordance with current network conditions and trends in network conditions over various periods of time.

FIG. 1 depicts a system for performing bandwidth estimation for video encoding, in accordance with various embodiments of the present disclosure. The system in FIG. 1 may comprise a device 100 (e.g., a computing device) comprising at least one processor 102 effective to encode a video stream for delivery to one or more recipient devices 130 (e.g., one or more servers) over a network 104, in accordance with various embodiments of the present disclosure. Network 104 may be, for example, a local area network (LAN) and/or a wide area network (WAN) such as the Internet. In various examples, device 100 may access network 104 via a wireless access point 160. Wireless access point 160 may be, for example, a router and/or a network switch. In at least some other examples, device 100 may access network 104 via a wired connection. Although a single recipient device 130 is depicted in FIG. 1, the disclosure is not limited thereto and, in at least some examples, the components and/or functionality of the recipient device shown and described in reference to FIG. 1 may be divided among multiple devices.

In various examples, a video stream may be sent from device 100 as video stream 142. Video stream 142 may include multiple renditions or may include a single rendition. Video stream 142 may be organized into video frames by encoder 121 of device 100. A video frame may be, for example, a raster of pixels, with each pixel comprising a pixel value. Video frames may be sent from device 100 over network 104 and received and/or presented by recipient device 130 using streaming technology. In various examples, a portion of the video stream may be presented by a recipient device 130 while subsequent portions of the video stream are simultaneously being sent to the recipient device 130. In some other examples, video stream 142 may be sent to recipient device 130 so that recipient device 130 can further process the video or store the video in a non-transitory, computer-readable memory.

In further examples, a prior portion of a video stream may be decoded and displayed by a recipient device at the same time that a subsequent portion of the video stream 142 is still being sent to the recipient device 130. In some examples, the encoded and transmitted image information may correspond to a live or nearly-live (e.g., with a short time delay of, for example, less than a few tenths of a second, less than a few seconds or less than a few minutes) transmission of an event, such as a playing of a video game, a news conference, real-time video conferencing, a sporting event, surveillance video, and many others. A live or nearly-live transmission of an event that is delivered using streaming technology may be referred to as live-streaming. It is noted however, that the transmission of information depicted in FIG. 1 is not limited to live or nearly-live transmission and may also include sending prior-recorded events, media, or other information.

Recipient device 130 may comprise at least one processor 103 and a non-transitory, computer-readable memory 106. Memory 106 may be effective to store instructions that when executed by at least one processor 103 are effective to perform the various bandwidth estimation techniques described herein. Recipient device 130 may be a computing device to which video stream 142 is sent by device 100. In various examples, recipient device 130 may be a client device where the video of video stream 142 is played back. In some other examples, recipient device 130 may be a server device effective to perform image processing techniques (e.g., computer vision techniques) on video stream 142. Recipient device 130 may comprise a decoder 131 effective to decode the encoded frames of video stream 142 sent by device 100. Additionally, recipient device 130 may comprise a buffer 132 effective to store one or more reference frames of video stream 142 for use in decoding inter-coded frames of video 142. In at least some examples, recipient device 130 may include playback components 133 effective to playback video stream 142.

In at least some examples, recipient device 130 may be effective to estimate bandwidth of a communication channel between device 100 and recipient device 130 (e.g., a communication channel over network 104) Recipient device 130 may send REMB messages, as described above. For example, an REMB message may indicate the estimated bit rate available on the network path between device 100 and recipient device 130. In various examples, an REMB message may specify the maximum bit rate at which device 100 should encode video data for the current network conditions. In various examples, in order to provide continuous updates on current estimated bandwidth conditions of the communication channel on network 104, REMB messages may be sent periodically or semi-periodically. In some examples, an REMB message may be sent from recipient device 130 to device 100 every 25 milliseconds, every 100 milliseconds, every 500 milliseconds, every 1.5 seconds, every 2 seconds, or some other suitable time period. In various examples, the REMB messages may specify a bit rate or be used to determine a bit rate at which encoder 121 should encode video stream 142.

In various examples, recipient device 130 may further comprise a network monitor 112. Network monitor 112 may be hardware or software effective to monitor network conditions experienced by recipient device 130. In some examples, network monitor 112 may be effective to monitor network condition(s) 108. Examples of a network condition (s) 108 may include packet loss (e.g., a percentage of packets lost), latency, round trip time ("RTT"), jitter, signal to noise ratio ("SNR"), received signal strength indicator ("RSSI"), etc. In at least some further examples, network condition(s) 108 may comprise an indication of the bandwidth of a communication channel established between device 100 and recipient device 130. In various examples, the bandwidth of the communication channel include a current bit rate of video stream 142 as well as metadata and/or audio data associated with the video stream 142. In some examples, network monitor 112 may monitor data received from a device 100 over network 104. The network condition(s) 108 may be monitored and/or detected as a time graph, as shown in FIG. 1. In other examples, network condition(s) 108 may be sampled at various times. Sampled values of network condition(s) 108 may be stored in memory 106. In various examples, the time graph data representing network condition(s) 108 may conclude with a current time. In other examples, the time graph data representing current network conditions 108 may represent a period of time over which the sampling, monitoring and/or detection of network conditions occurs. For example, the time period represented in the time graph data of current network conditions 108 may be 5 milliseconds, 50 milliseconds, 100 milliseconds, 300 milliseconds, 1 second, 2 seconds, 3 seconds, or any other suitable amount of time, as desired. The time graph data may represent a measure of a first network condition (e.g., packet loss, RTT, latency, etc.) of a communication channel between device 100 and recipient device 130 detected over a first period of time.

In a first example, network monitor 112 may monitor packet loss (e.g., the percentage of packets lost). Accordingly, in the example, network conditions 108 may represent packet loss. Threshold 110 may be a preselected network condition threshold used to determine that estimated bandwidth should be set at a particular value (e.g., a minimum and/or a reduced set value). In various examples, packet loss or another adverse network condition crossing threshold 110 may be used as an indicator that communication channel capacity has been exceeded by a current bit rate of video stream 142. For example, threshold 110 may represent a threshold percentage of packets lost. In the example, threshold 110 may be 3.9% of packets lost (or any other suitable value). In the example, at time 150, network conditions 108 indicate that packet loss has risen above the threshold 110 (e.g., 3.9%). Accordingly, network monitor 112 may drop the estimated bandwidth (e.g., an initial bandwidth estimate) to a set value (e.g., a minimum and/or a reduced set value). In the current example, network monitor 112 may set the estimated bandwidth at 150 kbps, although any suitable value may be used. In at least some other examples, network monitor 112 may reduce the estimated bandwidth by greater than 10% (e.g., by 50%) when packet loss has risen above the threshold 110. Continuing the example, recipient device 130 may generate an REMB message that indicates that video stream 142 should be encoded at 150 kbps or the selected reduced value. In various examples, at time 150, the network conditions may have deteriorated resulting in the increase in packet loss. Accordingly, packet loss may, in some examples, be used as an indicator of current available bandwidth. As described above, in addition to or instead of packet loss, various other network parameters may be used as an indicator of available bandwidth (e.g., RTT, latency, etc.).

As described in further detail below, when network conditions 108 have not yet crossed threshold 110, but where some packet loss (or other network parameter) is present and/or increasing (e.g., where a change in a network parameter indicates declining bandwidth), network monitor 112 may decrease the estimated bandwidth by a fixed and/or variable amount. For example, the current estimated bandwidth may be 16.0 Mbps. Network monitor 112 may determine that packet loss (e.g., network conditions 108) is increasing, potentially representing deteriorating network conditions. Accordingly, network monitor 112 may reduce the estimated bandwidth in the next REMB message. Network monitor 112 may reduce the estimated bandwidth by a fixed amount (e.g., by 10% to set estimated bandwidth at 14.4 Mbps) or by a variable amount (e.g., an amount proportional to the increase in packet loss relative to a previous packet loss value determined at a previous time). When a subsequent REMB message is to be generated by recipient device 130, if packet loss is still present, but is below threshold 110, network monitor 112 may again reduce the estimated bandwidth by either the fixed amount (e.g., estimated bandwidth may be reduced by 10% from 14.4 Mbps to 12.96 Mbps) or by a variable amount (e.g., an amount proportional to a change in packet loss relative to the packet loss determined when generating the previous REMB message).

As described in further detail below in reference to FIG. 2, in some examples, running averages of network conditions 108 and/or of bandwidth estimates may be determined over different time periods. For example, bandwidth estimation monitor 148 may be effective to calculate a running average (e.g., an average value calculated continuously over a particular recurrent time period) of network conditions 108 and/or estimated bandwidth of the communication channel over which video stream 142 is sent over a relatively short time period (e.g., <2 seconds or some other suitable time period) and a relatively long time period (e.g., >2 seconds or some other suitable time period). In various examples, in order to stabilize video encoding quality and to avoid overly reactive changes to short term bandwidth deterioration, bandwidth estimation monitor 148 (and/or recipient device 130, more generally) may determine an appropriate modification of estimated bandwidth based on the running averages of estimated bandwidth (and/or network conditions 108) calculated over different time periods. In general, if network conditions (and/or estimated bandwidth) deviates to a significant degree (e.g., by more than a threshold percentage) from the short term running average, but do not deviate to a significant degree from a longer term running average, recipient device 130 may not modify the estimated bandwidth or may only slightly modify the estimated bandwidth (e.g., by 5-10% or some other suitable value). Generally, if network conditions (and/or estimated bandwidth) deviate to a significant degree from both the short term running average and one or more long term running averages, modification of estimated bandwidth by recipient device 130 (and/or bandwidth estimation monitor 148) may be more significant. In some examples, the degree to which the estimated bandwidth is modified based on the various running averages may be determined using a decision tree and/or other machine learning technique. In some further examples, a table may be used to associate various bandwidth modifications with various changes in network conditions relative to the running averages of different time periods. For example, if the current network condition (and/or bandwidth) deviates from the short term running average by between 15-20% and deviates from a longer term running average by 15-20%, a table and/or decision matrix stored in memory 106 may be used to determine that the estimated bandwidth should be modified by 20%. In another example, if the current network condition (and/or bandwidth deviates from the short term running average by between 20-25%, but deviates from a longer term running average by only 3-5%, the table and/or decision matrix may be used to determine that estimated bandwidth should be modified by only 5% or should remain unmodified. The previous percentages are merely examples of possible parameters and modifications. The actual percentages and parameters may be adjusted depending on the desired implementation.

In various examples, a low threshold 111 may be used. If network conditions 108 (e.g., packet loss, latency, RTT, etc.) are below low threshold 111 network monitor 112 may maintain the current estimated bandwidth or may increase the estimated bandwidth, as described in further detail below. In at least some examples, the low threshold 111 may be set at or close to 0% for percentage of packets lost. In various other examples, the low threshold 111 may be set at value that is greater than zero, but less than a value of high threshold 110.

In various video streaming embodiments, temporal scalability may be used to drop frames in order to prevent playback interruption and/or decreases in overall video quality. In various examples, network monitor 112 may be configured to detect dropped frames of video stream 142. Frames may include a frame index number embedded in the metadata of each frame. Accordingly, recipient device 130 may determine whether or not one or more frames have been dropped to prevent interruption of the playback of video stream 142. In various examples, packet loss may be relatively low (e.g., 0.5%) however, greater than a threshold number (e.g., a "frame drop threshold") of frames may be dropped over a particular time period (e.g., between two REMB messages). Such a scenario may indicate that estimated bandwidth should be lowered as packet loss is scattered over multiple frames causing frame drops. A dropped frame may be a frame of video stream 142 that is not played back due to being incomplete at the time of playback. Accordingly, the estimated bandwidth may be reduced by a fixed or variable amount in a similar manner as described above. Frame drops may be determined over running averages in a manner similar to that described above in order to determine the appropriate estimated bandwidth.

In various examples, network conditions 108 (e.g., frame drops, packet loss, latency, etc.) may be used as input signals to a machine learning model to determine the appropriate estimated bandwidth based on the various input signals. For example, a deep learning architecture such as a recurrent neural network may be trained to optimize bandwidth estimation based on current network conditions 108 and/or based on a current bandwidth estimate. In addition to the various network parameters described above, in some examples, rate control parameters such as quantization parameters ("QP") of encoder 121 may be used as input signals to a machine learning model in order to improve bandwidth estimation based on current network conditions.

In some examples, quantization parameters may be monitored and may be used as an indicator of available bandwidth in conjunction with other network parameters. As previously described, QP may be monitored and input into a machine learning model to determine an estimated bandwidth and/or an appropriate change in estimated bandwidth.

Encoder 121 may perform a quantization process when encoding frames of video image data to compress the video image data. For example, encoder 121 may perform a discrete cosine transform (DCT), a Fourier transform, a Hadamard transform, or another "lossy" or lossless image transform in order to represent the video image data in the frequency domain. In DCT, coefficients of different frequency cosine waves are calculated based on the contribution of the different frequency cosine waves to the portion of the image being encoded. After subjecting image data to a DCT, the lower frequency cosine wave coefficients are typically much larger relative to the higher frequency cosine wave coefficients. This is due to the higher frequency cosine waves typically having a less significant impact (i.e., the higher frequency cosine waves contribute less to the image or portion of the image) on the image being encoded and the lower frequency cosine waves having a more significant impact on the image being encoded. The coefficients of the different frequency cosine waves may be divided by quantization parameters ("QP") during a quantization process and rounded to the nearest integer, to further compress the data. In some examples, the quantization values may be determined using a rate control algorithm. A rate control algorithm may solve an optimization problem to determine the number of bits that should be used to encode macroblocks of image data and/or a frame of image data at a given level of image quality and/or at a given level of distortion. However, in at least some other examples, encoder 121 (and/or middleware executing on device 100) may update quantization parameters based on the estimated frame size and/or complexity of the video data.

Reducing the QP results in larger compressed frame sizes, which in turn increases the bit rate of video stream 142 relative to encoding and transmitting the same video data encoded with a higher quantization parameter. Conversely, if encoder 121 determines an estimated compressed frame size for a second uncompressed frame is relatively large in size (e.g., due to high spatial complexity and/or a low quantization parameter), encoder 121 may increase the quantization parameter to reduce the frames size of the compressed frame (e.g., in order to avoid exceeding the maximum channel capacity of network 104 or in order to avoid exceeding the maximum bit rate specified in an REMB message received from recipient device 130).

In some examples, QP may be used to distinguish between actual deterioration in network conditions and "false" bandwidth declines and increases. Network monitor 112 may receive an indication of current QP values from device 100. For example, frame metadata may include an indication of current QP values. In various other examples, QP values may be sent from device 100 to recipient device 130 on a different communication band relative to video stream 142. In various further examples, QP values may be encoded within the bitstream of video stream 142. Network monitor 112 may determine that QP is declining over time and that the bit rate of video stream 142 is also declining. Such a scenario may indicate that the scene depicted in the video (e.g., a scene captured by camera 136) is relatively simple (e.g., the image data has low spatial complexity and/or there is a lack of movement in the scene). Accordingly, fewer bits are needed to encode the frames and, as a result, the bit rate declines while QP also declines and/or reaches a minimum value. In such an example, network monitor 112 may determine that the estimated bandwidth may be maintained and/or increased in accordance with bandwidth estimation increase techniques described below. As previously described, a QP signal and a bit rate signal may be provided as inputs to a machine learning model of network monitor 112 (and/or of a different component of recipient device 130) along with one or more other signals (e.g., packet loss, frame drops, etc.) to determine an optimized bandwidth estimate.

In another example, network monitor 112 may determine that QP is increasing over time (or has reached a maximum value) and that the bit rate of video stream 142 is also increasing and/or is relatively high. Such a scenario may indicate that the scene depicted in the video (e.g., a scene captured by camera 136) is relatively complex (e.g., high spatial complexity attending a large amount of movement in scene). In such an example, network monitor 112 may determine that the estimated bandwidth may be increased as the scene is complex (provided that packet loss, latency, RTT and/or other network conditions 108 are within acceptable tolerance ranges). However, in some examples, in addition to communicating the increased estimated bandwidth to device 100 in an REMB message, recipient device 130 may send an indication that frame rate and/or resolution of video stream 142 should be decreased in order to prevent packet loss and/or playback error due to the increasing bit rate. The indication to reduce frame rate and/or resolution may be sent as a part of the REMB message or may be sent as a separate message from recipient device 130 to device 100. In various examples, the indication may specify a particular frame rate or may recommend an amount by which to decrease the frame rate.

In various examples, running averages of QP values may be determined over a variety of different time periods similar to the techniques described above. In various examples, machine learning techniques, tables, and/or a decision matrix may be used to select the particular amount by which to modify the estimated bandwidth based on the comparison of current QP values with different running averages of QP values.

In various examples, recipient device 130 may comprise a bandwidth estimation monitor 148. Bandwidth estimation monitor 148 may determining one or more running averages of bandwidth estimation values determined by recipient device 130. In various examples, bandwidth estimation monitor 148 may be effective to prevent drastic changes in estimated bandwidth due to transient changes in network conditions. Bandwidth estimation monitor 148 is described in further detail below with respect to FIG. 2. Additionally, in some examples, recipient device 130 may comprise a non-linear bit rate filter 152. In some examples, non-linear bit rate filter 152 may be effective to non-linearly increase bandwidth estimation when network conditions (e.g., network conditions 108) are improving over time. Non-linear bit rate filter 152 is described in further detail below with respect to FIG. 6.

Figure 2:
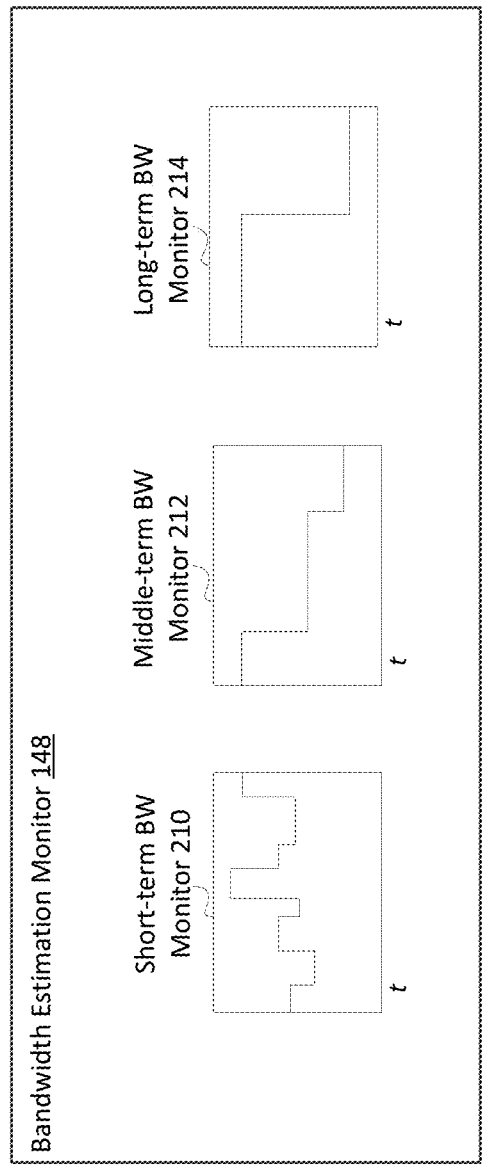
FIG. 2 depicts an example of a bandwidth estimation monitor, in accordance with various aspects of the present disclosure.

FIG. 2 depicts an example of a bandwidth estimation monitor 148, in accordance with various aspects of the present disclosure. Although bandwidth estimation monitor 148 is shown and described in FIG. 1 as a component of recipient computing device 130, in various examples bandwidth estimation monitor 148 may instead be instantiated in one or more other computing devices.

In various examples, bandwidth estimation by recipient device 130 may be too reactive to transient changes in network conditions. For example, a momentary slowdown in network conditions may cause packet loss resulting in a drastic decrease in the bandwidth estimated by recipient device 130. The decrease in estimated bandwidth may, in turn, lead to a decrease in the bit rate of video stream 142 as encoded by encoder 121 of device 100. While such a decrease may be warranted when network conditions remain in a deteriorated state for a long period of time (e.g., 15 seconds, 3 minutes, 20 minutes, etc.), drastically decreasing the estimated bandwidth for only a short term deterioration of network conditions (e.g., packet loss exceeding 4% for 1 millisecond and thereafter recovering to 0.1%) may cause undesirable variation in video quality as encoded by encoder 121 according to REMB messages received from recipient device 130.

Accordingly, bandwidth estimation monitor 148 may be effective to monitor the bandwidth estimated by recipient device 130 over multiple time frames. For example, bandwidth estimation monitor 148 may monitor the estimated bandwidth using short-term bandwidth monitor 210, middle-term bandwidth monitor 212, and/or long-term bandwidth monitor 214. In various embodiments, more or fewer monitoring periods may be used apart from what is depicted in FIG. 2. Any suitable number of monitoring periods and/or running averages may be used in accordance with the present disclosure. In various examples, the relativistic terms "short", "middle", and "long" may indicate the lengths of the time periods for which a running average is determined relative to the other time periods. For example, short-term bandwidth monitor 210 may monitor a shorter period of time relative to middle-term bandwidth monitor 212, which may in turn monitor a shorter period of time relative to long-term bandwidth monitor 214. A "running average" may be an average value calculated continuously over a particular recurrent time period. Although, bandwidth is described as being monitored in the examples discussed in reference to FIG. 2, in various other examples, any of network conditions 108 may be monitored instead, and/or in additional to bandwidth.

In the example depicted in FIG. 2, bandwidth estimation monitor 148 may monitor the estimated bandwidth over a short period of time (e.g., <200 ms or some other suitable amount of time) using short-term bandwidth monitor 210, over a middle-term period of time (e.g., between 200 ms and 1 second) using middle-term bandwidth monitor 212, and over a long period of time (e.g., greater than 5 seconds). The time periods described in the examples are for illustrative purposes only. Any suitable time periods may be used in place of those explicitly described in the examples herein. Bandwidth estimation monitor 148 may determine a running average of estimated bandwidth (e.g., an average of the bit rates specified in the REMB messages sent by recipient device 130) for each of the short-term bandwidth monitor 210, middle-term bandwidth monitor 212, and long-term bandwidth monitor 214.

If a short-term decrease in bandwidth is large (e.g., the bandwidth decreases by more than a threshold percentage (e.g., >50% decrease) of the short-term running average), but the middle-term and long-term changes are relatively small (e.g., <5% change or some other suitable value), bandwidth estimation may be slightly modified. For example, bandwidth estimation may be decreased by 5-10% and/or by <25% per REMB message, while the conditions persist. In various other examples, when the deviation from the short-term running average is significant (e.g., greater than a short-term threshold), but the deviation from the mid-term running average and/or long-term running average is small, bandwidth estimation monitor 148 may not change the bandwidth estimation. Conversely, if the short-term decrease and middle-term decrease are large, the estimated bandwidth may be decreased more quickly. For example, bandwidth may be decreased by 20%, 35%, 50% or some other suitable value (e.g., greater than or equal to 25%) to react more quickly to deteriorating network conditions. Similarly, if short-term, middle-term, and long-term averages of estimated bandwidth all show a decline, the estimated bandwidth may be modified downward by 20%, 35%, 50% or some other suitable value to react more quickly to deteriorating network conditions.

As previously described, the running averages of estimated bandwidth over different time frames (e.g., as determined using short-term bandwidth monitor 210, middle-term bandwidth monitor 212, and/or long-term bandwidth monitor 214, or some other number of time-period monitors) may be used as an input to a machine learning component of recipient device 130. The machine learning component may determine an optimized adjustment to the estimated bandwidth based on the running averages as well as based on input signals representing the network conditions 108, as discussed above in reference to FIG. 1.

Figure 3:
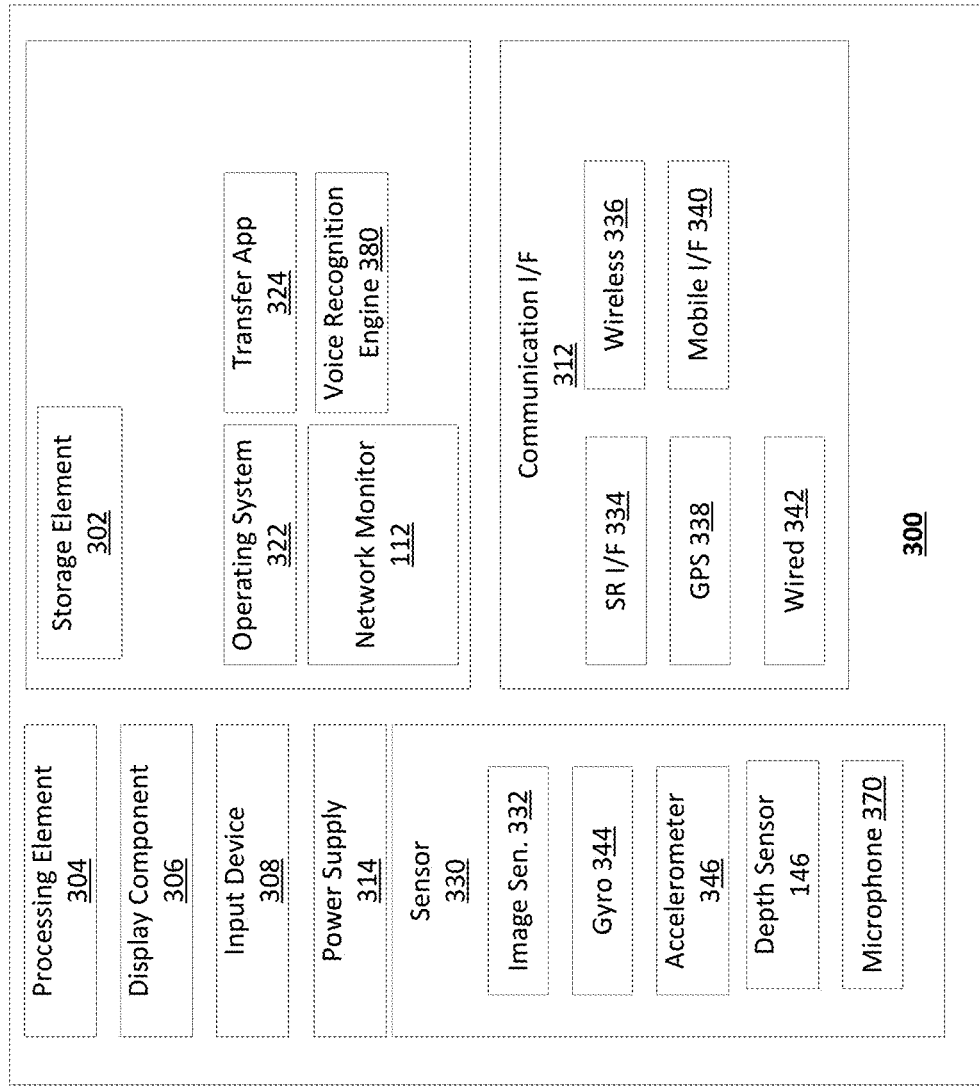
FIG. 3 depicts a recipient computing device effective to perform bandwidth estimation, in accordance with embodiments of the present disclosure.

FIG. 3 is a block diagram showing an example architecture 300 of a user device, such as the device 100, recipient device 130, and/or other computing devices described herein. It will be appreciated that not all user devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to send and/or receive image and/or video data to and/or from other devices (e.g., a mobile device, remote device, image capture device, and/or display device). In some examples, the transfer application 324 may also be configured to upload the received images to another device that may perform processing as described herein (e.g., a mobile device or another computing device).

In various examples, a network monitor 112 may be effective to monitor network conditions of a network over which a device represented by architecture 300 is communicating. Network monitor 112 may be effective to provide data related to packet loss, latency, RTT, jitter, end to end time, SNR, etc. on the network. Additionally, in some examples, network monitor 112 may determine running averages of estimated bandwidth over different time periods (e.g., as described above in reference to FIG. 2). Network monitor 112 and/or another component stored in storage element 302 of architecture 300 may be effective to execute a machine learning module effective to optimize bandwidth estimation in accordance with the various techniques described herein.

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. Voice recognition engine 380 may interpret audio signals of sound captured by microphone 370. In some examples, voice recognition engine 380 may listen for a "wake word" to be received by microphone 370. Upon receipt of the wake word, voice recognition engine 380 may stream audio to a voice recognition server for analysis. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices. For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output.

Motion sensors may include any sensors that sense motion of the architecture including, for example, gyro sensors 344 and accelerometers 346. Motion sensors, in some examples, may be used to determine an orientation, such as a pitch angle and/or a roll angle of a camera. The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338.

In some examples, architecture 300 may include a depth sensor 146. Depth sensor 146 may be effective to determine a distance between image sensor 332 and a surface detected by depth sensor 146. In some examples, the depth sensor 146 may determine the contours of the surface and may be capable of using computer vision techniques to recognize facial patterns or other markers within the field of view of the depth sensor 146's infrared sensor. In some examples, the depth sensor 146 may include an infrared projector and camera. Processing element 304 may build a depth map based on detection by the infrared camera of a pattern of structured light displayed on a surface by the infrared projector. In some other examples, the depth sensor 146 may include a time of flight camera that may compute distance based on the speed of light by measuring the time of flight of a light signal between a camera of the depth sensor 146 and a surface of an environment. In some examples, processing element 304 may be effective to determine the location of various objects in the physical environment within the field of view of image sensor 332 based on the depth map created by the depth sensor 146. As noted above, in some examples, non-infrared depth sensors, such as passive stereo camera pairs, or non-identical camera pairs, may be used in place of, or in addition to, infrared light sources of depth sensor 146.

Figure 4:
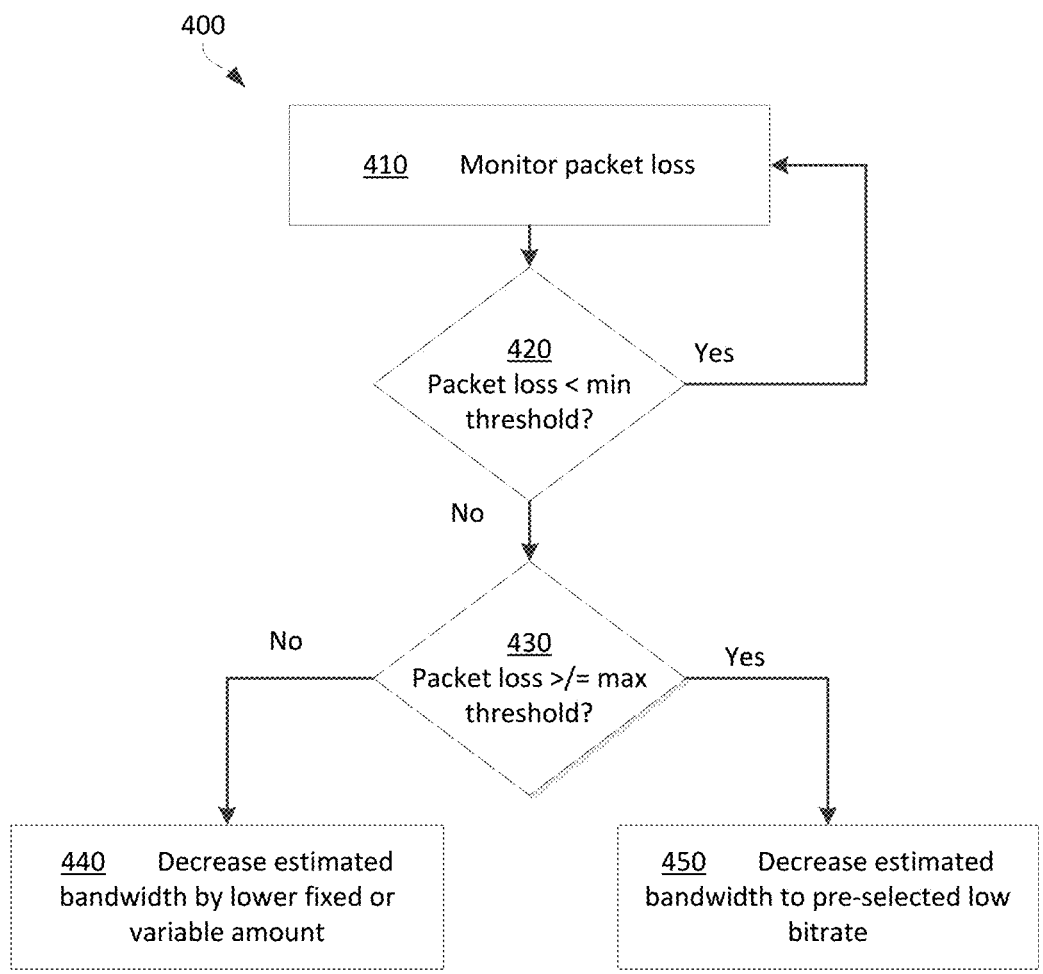
FIG. 4 depicts a flowchart illustrating an example process for performing bandwidth estimation for video encoding, in accordance with various embodiments of the present disclosure.

FIG. 4 is a flowchart 400 illustrating an example process for performing bandwidth estimation for video encoding that may be used in accordance with various embodiments of the present disclosure. In some examples, the process of FIG. 4 may be performed by a recipient computing device (e.g., by one or more servers) that receives video from one or more other computing devices. For example, the process described in FIG. 4 may be performed by recipient device 130 depicted in FIG. 1.

The process of FIG. 4 may begin at operation 410, "Monitor packet loss." At operation 410, packet loss may be monitored. In various examples, network monitor 112 described above in reference to FIG. 1 may be used to monitor packet loss or another network condition. In at least some examples, percentage of packets lost and/or another network condition (e.g., latency, jitter, RTT, etc.) may be used as an indicator of currently available bandwidth.

The process of FIG. 4 may continue from operation 410 to operation 420 at which a determination may be made whether packet loss is less than a minimum threshold. For example, as described above in FIG. 1, a determination may be made whether packet loss is less than a low threshold 111. In some examples, low threshold 111 may represent an acceptable level of packet loss for a current estimated bandwidth. If the packet loss is less than the minimum threshold, processing may return to operation 410 and network monitor 112 and/or another component of recipient device 130 may continue to monitor packet loss (and/or another network condition).

Alternatively, if packet loss is greater than or equal to the minimum threshold, processing may continue from operation 420 to operation 430 at which a determination may be made whether packet loss exceeds a higher (e.g., a "maximum") threshold. The higher threshold may represent a level of packet loss or a level of the currently monitored network condition that is higher than expected for the current estimated bandwidth. If, at operation 430, the packet loss is less than the higher threshold, processing may continue from action 430 to action 440. At action 440 the estimated bandwidth may be decreased by a lower fixed amount (e.g., by 5%, 10%, 12%, or any other suitable amount). Alternatively, at action 440, the estimated bandwidth may be decreased by a variable amount based on the current packet loss or based on the change in the packet loss relative to a previous time.

Conversely, if, at operation 430, the packet loss is greater than or equal to the higher threshold, processing may continue from operation 430 to operation 450 at which the estimated bandwidth may be decreased to a pre-selected low bit rate or to a certain percentage of the current estimated bandwidth. In an example, the current estimated bandwidth may be 16 Mbps and the higher threshold percentage of packet loss may be 3.9%. At operation 430, a determination may be made that the current packet loss is at 4.8%. Accordingly, the estimated bandwidth may be decreased by 50% (or by any other suitable percentage or value) to 8 Mbps. In another example, the estimated bandwidth may be decreased to a minimum bit rate (e.g., 150 kbps) when packet loss exceeds the higher threshold percentage.

Figure 5:
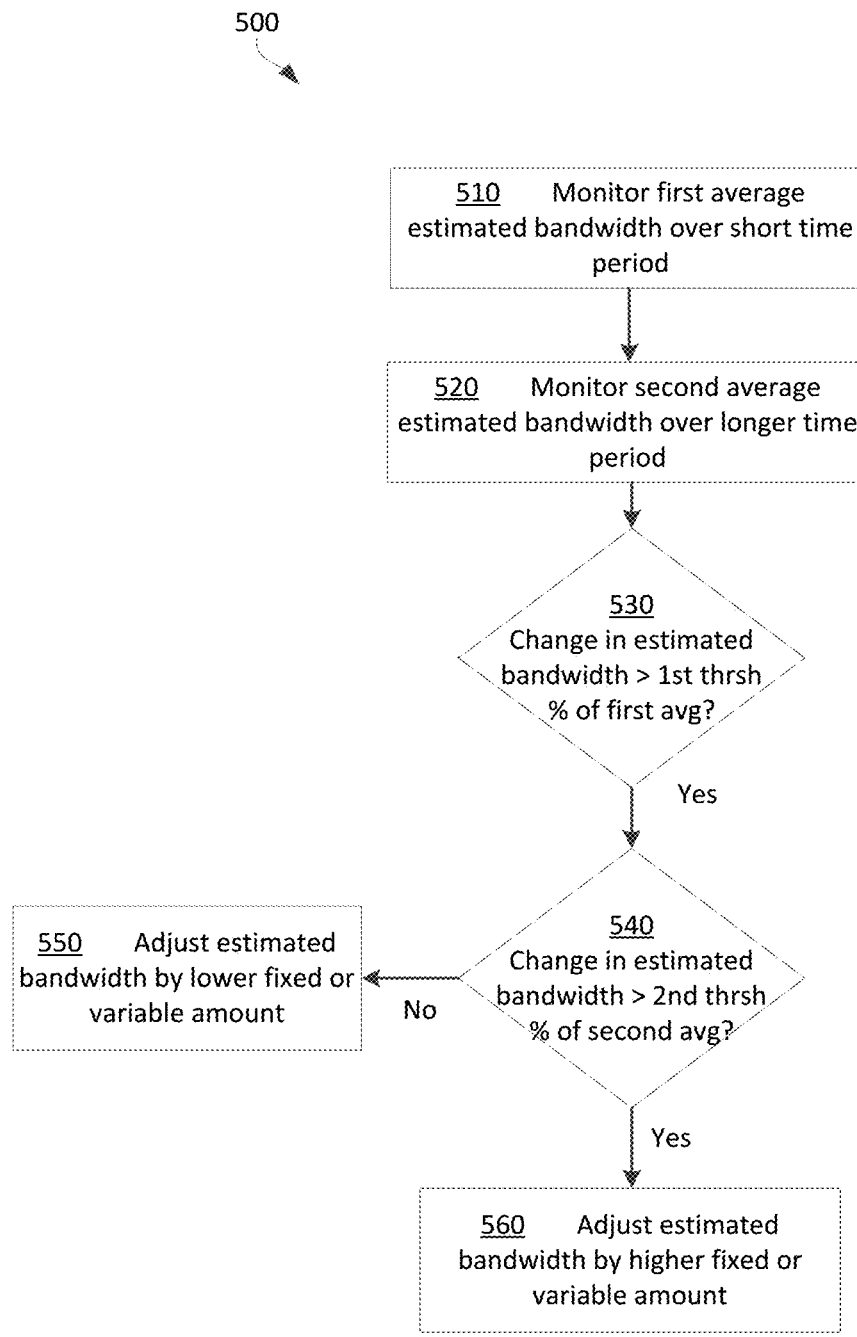
FIG. 5 depicts a flowchart illustrating another example process for performing bandwidth estimation for video encoding, in accordance with embodiments of the present disclosure.

FIG. 5 depicts a flowchart 500 illustrating another example process for performing bandwidth estimation that may be used in accordance with various embodiments of the present disclosure. In some examples, the process of FIG. 5 may be performed by a recipient device (e.g., by one or more servers) that receives video from one or more other cameras and/or computing devices. For example, the process described in FIG. 5 may be performed by recipient device 130 depicted in FIG. 1 and/or by bandwidth estimation monitor 148 depicted in FIGS. 1 and 2.

The process of FIG. 5 may begin at operation 510, "Monitor first average estimated bandwidth over short time period". At operation 510, a first running average (e.g., a continually-calculated average over a particular time interval) of estimated bandwidth determined by recipient device 130 and/or another computing device may be determined over a "short time period". The short time period may be any suitable amount of time that is shorter than the "longer time period" discussed below at operation 520. In some examples, the short time period may be <200 ms, although any suitable amount of time may be used depending on the desired implementation.

Processing may continue to operation 520, "Monitor second average estimated bandwidth over longer time period." At operation 520, a second running average of estimated bandwidth may be determined over a time period that is longer than the time period described above with respect to operation 510. In various examples, the longer time period may be 1 second, 2 seconds, 5 seconds, or any other suitable value. Although in FIG. 5 operation 510 is shown as preceding operation 520, operations 510 and 520 may be performed continually in parallel or operation 520 may precede operation 510. Additionally, as described above in reference to FIG. 2, recipient device 130 and/or bandwidth estimation monitor 148 may determine any number of running averages of estimated bandwidth apart from the time periods described with respect to FIGS. 2 and 5. Any number of suitable time periods may be used, as desired, and a respective number of running averages of estimated bandwidth over those time periods may be calculated.

Processing may continue from operation 520 to operation 530 at which a determination may be made whether the current estimated bandwidth (or other network condition) deviates from the first running average (e.g., the running average of estimated bandwidth for the shorter time period determined at operation 510) by greater than (or equal to, in various examples) a first threshold percentage. In various examples, the first threshold percentage may indicate an acceptable amount by which it is permissible for the estimated bandwidth (and/or other network condition) to vary from the first running average. If a determination is made that the current estimated bandwidth deviates from the first running average by greater than (or equal to) the first threshold percentage, processing may continue to operation 540.

At operation 540, a determination may be made whether the current estimated bandwidth deviates from the second running average by greater than (or equal to, in various examples) a second threshold percentage. If a determination is made that the current estimated bandwidth deviates from the second running average by greater than (or equal to) the second threshold percentage, processing may continue to operation 560.

At operation 560, the estimated bandwidth may be modified by a higher fixed or variable amount. For example, if at action 530, a determination is made that the current estimated bandwidth deviates from the first average (e.g., the short term running average) by greater than 50% and deviates from the second average (e.g., the longer term running average) by greater than 50%, the estimated bandwidth may be modified by a higher fixed amount (e.g., by 45% 50%, etc.) or by a variable amount (e.g., by an amount proportional to the change in estimated bandwidth relative to the first and second averages). The threshold percentages used above are by way of example only. Any suitable threshold percentages may be used in accordance with the desired implementation.

Conversely, if at operation 540 a determination is made that the current estimated bandwidth deviates from the second running average by less than a second threshold percentage, the estimated bandwidth may be modified by a lower fixed or variable amount. For example, if at action 550, a determination is made that the current estimated bandwidth deviates from the second average by only 15%, the estimated bandwidth may be modified by a lower fixed amount (e.g., by 10%, 5%, 12%, 3.7%, etc.) or by a variable amount (e.g., by an amount proportional to the deviation).

As described below, in various examples, when the current estimated bandwidth exceeds the running averages calculated by bandwidth estimation monitor 148 in the various time windows (e.g., short term bandwidth monitor 210, middle-term bandwidth monitor 212, long-term bandwidth monitor 214, described above in reference to FIG. 2), non-linear bit rate filter 152 may be effective to increase the estimated bandwidth at different rates depending on the current bit rate of the received video.

Figure 6:
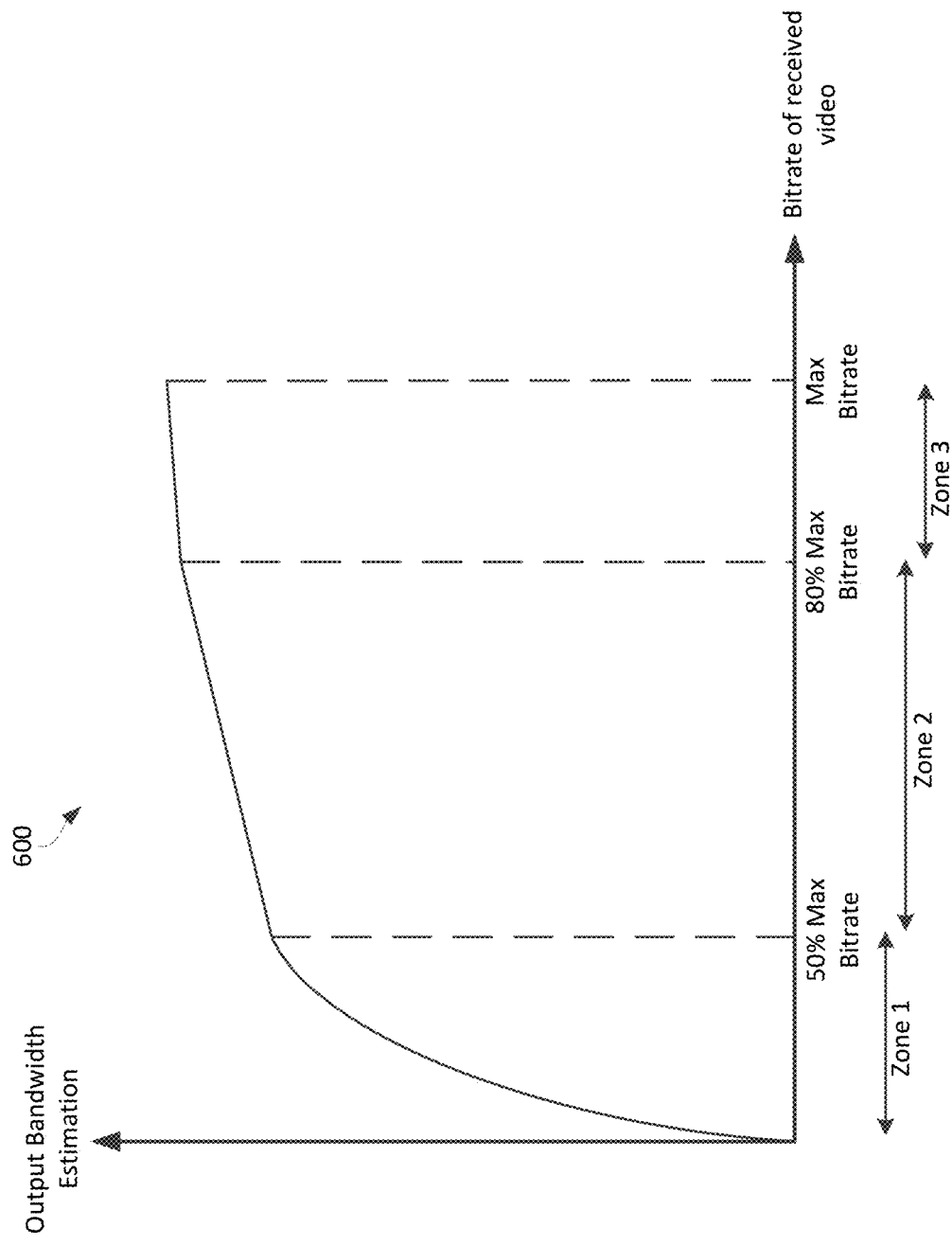
FIG. 6 depicts an example of a non-linear bandwidth estimation filter in accordance with embodiments of the present disclosure.

FIG. 6 depicts an example of a non-linear bandwidth estimation filter component 600 in accordance with embodiments of the present disclosure. As depicted in FIG. 6, the estimated bandwidth provided to device 100 (e.g., the "Output Bandwidth Estimation") may be increased at different rates depending on the bit rate of video stream 142 received from device 100 and depending on the current state of the network conditions 108. It should be appreciated that the particular placement of the various zones depicted in FIG. 6 (e.g., at 50% of maximum bandwidth, 80% of maximum bandwidth and/or at maximum bandwidth) is configurable. Similarly, the number of different zones is configurable and can be modified according to a particular implementation.

In an example, the bit rate of video stream 142 received at recipient device 130 may be determined to be at 25% of a maximum bit rate (e.g., 20 Mbps). If recipient device 130 determines that the bandwidth estimate included in the next REMB message is to be increased (e.g., according to the packet loss falling below low threshold 111), recipient device 130 may increase the bandwidth estimate according to a function of zone 1 (e.g., according to $f(x)=\ln(x)$ or some other suitable function). In various examples, the bandwidth estimate may be increased at a higher rate in zone 1 (e.g., an increase rate of 7%, 8%, between 4-10%, or some other increase rate) so that the video quality of video stream 142 may be quickly improved when network conditions so permit. In the example depicted in FIG. 6, zone 1 extends to a range of 50% of the maximum bandwidth of video stream 142 (as defined by encoder 121, device 100 and/or recipient device 130). Upon reaching zone 2, the rate of increase may decline.

For example, in FIG. 6, if the bit rate of video stream 142 received at recipient device 130 is determined to be at 60% of a maximum bit rate and recipient device 130 determines that the output bandwidth estimate is to be increased in the next REMB message (based on packet loss and/or other network parameters described herein), recipient device 130 may increase the bandwidth according to a function of zone 2. In various examples, the function of zone 2 may increase at a slower rate relative to the function in zone 1. In at least some examples, the function of zone 2 may be a linear function effective to linearly increase the output bandwidth estimate. Similarly, in zone 3, the output bandwidth estimate may be increased more slowly relative to zone 2 and zone 1. Generally, as the bit rate of video stream 142 increases to a maximum bit rate, the rate of increase of the output bandwidth estimation slows down. Conservatively increasing the output bandwidth estimation for higher received bit rates (e.g., bit rates in zones 2 and/or 3) may avoid overshooting the actual available bandwidth of the communication channel and thereby avoid packet loss and/or playback interruption. Conversely, aggressively increasing the output bandwidth estimation for lower received bit rates (e.g., bit rates in zone 1) may result in the quality of video stream 142 quickly recovering to an acceptable level of video quality (e.g., 50% of maximum bit rate) following a network slow-down event.

Among other potential benefits, a system in accordance with the present disclosure may allow for improved video streaming as compared to previous technologies. Additionally, in comparison to previous attempts, instead of estimating bandwidth based only on the most recent bit rate of a video stream, the techniques described herein allow for a more holistic approach to bandwidth estimation and may filter adjustments in bandwidth estimation to avoid reacting to statistical outlier data. Advantageously, the various technical improvements described herein maximize video quality while avoiding drastic increases and decreases in the encoded bit rate of a video stream in response to false positive network data and/or due to temporary and short-lived network congestion.

Figure 7:
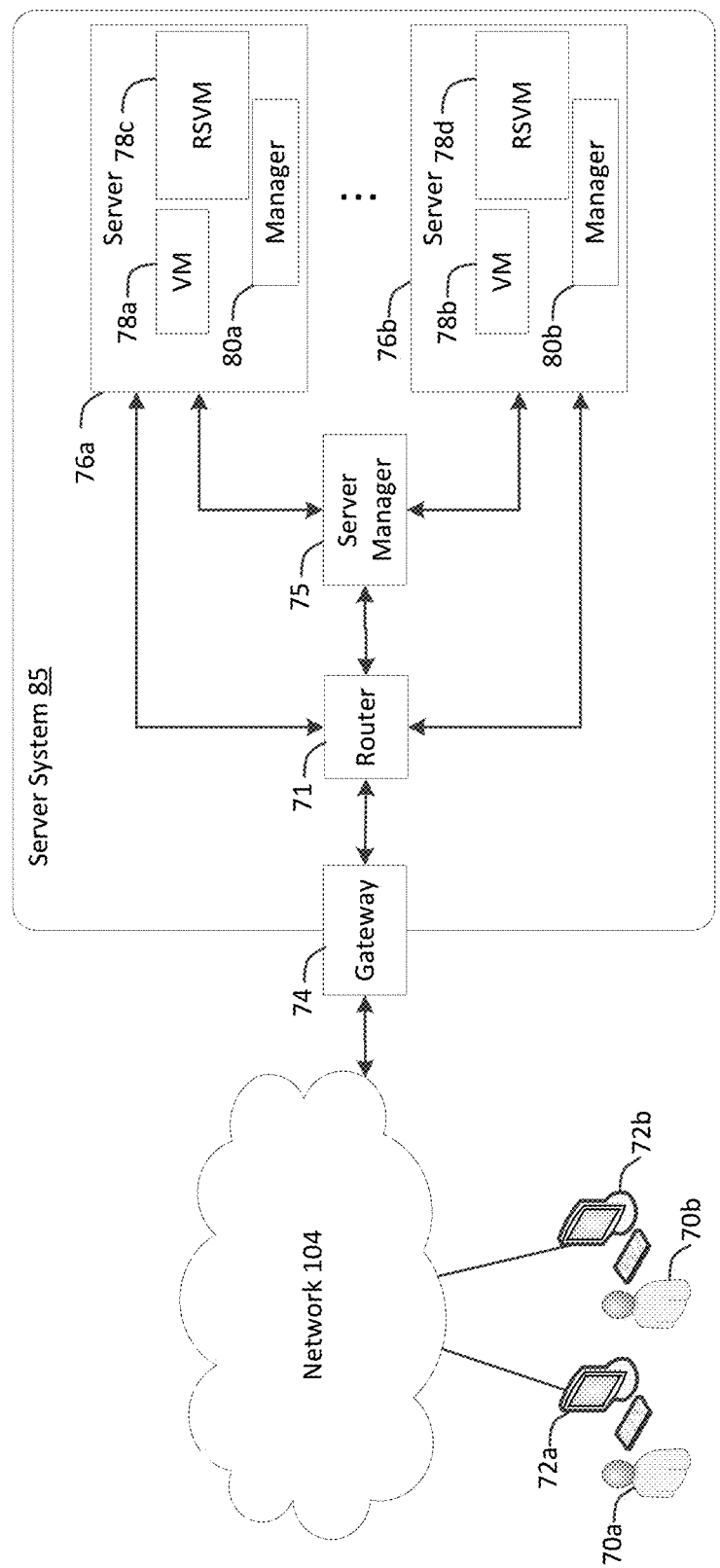
FIG. 7 depicts an example system for sending and providing data over a network, in accordance with various embodiments of the present disclosure.

An example system for sending and providing data will now be described in detail. In particular, FIG. 7 illustrates an example computing environment in which the embodiments described herein may be implemented. FIG. 7 is a diagram schematically illustrating an example of a server system 85 that can provide computing resources to users 70a and 70b (which may be referred herein singularly as user 70 or in the plural as users 70) via user computers or other network-connected devices 72a and 72b (which may be referred herein singularly as computer 72 or in the plural as computers 72) via network 104. In various examples, device 100 depicted in FIG. 1 may be an example of a computer or other network-connected device 72a and/or 72b. Server system 85 may be configured to provide computing resources for executing applications on a permanent or an as-needed basis. The computing resources provided by server system 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Server system 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are rendition switching virtual machine ("RSVM") instances. The RSVM virtual machine instances 78c and 78d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to computers 72. User computers 72 may be computers utilized by users 70 or other customers of server system 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing server system 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by server system 85. In this regard, server system 85 might provide a gateway or web interface through which aspects of its operation may be configured through the use of a web browser application program executing on user computer 72. Alternately, a stand-alone application program executing on user computer 72 might access an application programming interface (API) exposed by server system 85 for performing the configuration operations. Other mechanisms for configuring the operation of various web services available at server system 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example server system 85 shown in FIG. 7, a router 71 may be utilized to interconnect the servers 76a and 76b. Router 71 may also be connected to gateway 74, which is connected to network 104. Router 71 may be connected to one or more load balancers, and alone or in combination may manage communications within networks in server system 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example server system 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that server system 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method for remote estimation of bandwidth, the method comprising:
receiving, by a computing device over a communication channel of a wide area network (WAN), a video stream at a first bit rate;
determining, by the computing device, an initial bandwidth estimate of the communication channel, wherein the initial bandwidth estimate is equal to the first bit rate;
determining, by the computing device, a first percentage of lost packets of the video stream over a first time period;
determining, by the computing device, that the first percentage of lost packets deviates from a first average percentage of lost packets by more than a first threshold percentage, wherein the first average percentage of lost packets is determined over the first time period, and the first threshold percentage is a first indicator that a capacity of the communication channel is exceeded by a current bit rate of the video stream;
generating, by the computing device, a first bandwidth estimate of the communication channel, wherein the first bandwidth estimate comprises the initial bandwidth estimate reduced by between 5% and 10%;
sending, by the computing device over the WAN, a first indication of the first bandwidth estimate of the communication channel to a device encoding the video stream;
determining, by the computing device, a second percentage of lost packets of the video stream over a second time period;
determining, by the computing device, that the second percentage of lost packets deviates from a second average percentage of lost packets by more than the first threshold percentage, wherein the second average percentage of lost packets is determined over the second time period;
generating, by the computing device, a second bandwidth estimate of the communication channel, wherein the second bandwidth estimate is 150 kbps; and
sending, by the computing device over the WAN, a second indication of the second bandwidth estimate of the communication channel to the device encoding the video stream.

2. The method of claim 1, further comprising:
determining a first running average of estimated bandwidth over the first time period, wherein the first time period is less than or equal to 250 ms;
determining a second running average of estimated bandwidth over the second time period, wherein the second time period is greater than or equal to 250 ms;
determining a third bandwidth estimate of the communication channel based on a second bit rate of the video stream;
determining that the third bandwidth estimate of the communication channel deviates from the first running average of estimated bandwidth by greater than a second threshold percentage, wherein the second threshold percentage is a second indicator that the capacity of the communication channel is exceeded by the current bit rate of the video stream;
determining that the third bandwidth estimate of the communication channel does not deviate from the second running average by greater than the second threshold percentage; and
decreasing the third bandwidth estimate by 5%-10%.

3. The method of claim 1, further comprising:
receiving, over a third time period, the video stream at the first bit rate;
determining a third bandwidth estimate of the communication channel based on a third percentage of packets lost, wherein the third bandwidth estimate indicates that the first bit rate can be increased;
determining that the first bit rate is less than 50% of a maximum bit rate of a video encoder encoding the video stream;
generating a fourth bandwidth estimate by increasing the first bit rate by a first amount between 4% and 10%;
receiving, at a fourth time period, the video stream at a second bit rate higher than the first bit rate;
determining that the fourth bandwidth estimate is greater than the second bit rate;
determining that the second bit rate is between 50% and 80% of the maximum bit rate; and
generating a fifth bandwidth estimate by increasing the second bit rate by a second amount between 1% and 4%.

4. A method, comprising:
receiving a video stream at a first bit rate over a communication channel;
determining a first value of a network condition of the communication channel;
determining a first average value of the network condition over a first time period;
determining that the first value deviates from the first average value by greater than a first threshold percentage, wherein the first threshold percentage indicates a percentage by which it is permissible for the network condition to vary from the first average value over the first time period;
determining a first bandwidth estimate of the communication channel, wherein the first bandwidth estimate comprises the first bit rate reduced by a first percentage;
determining a second value of the network condition of the communication channel;
determining a second average value of the network condition over a second time period, wherein the second time period is greater than the first time period;
determining that the second value deviates from the second average value by greater than a second threshold percentage, wherein the second threshold percentage indicates a second percentage by which it is permissible for the network condition to vary from the second average value over the second time period; and
determining a second bandwidth estimate of the communication channel, wherein the second bandwidth estimate is less than the first bandwidth estimate.

5. The method of claim 4, further comprising:
receiving an indication of a quantization parameter at which a first portion of the video stream was encoded;
determining a second bit rate of the first portion of the video stream; and
determining a third bandwidth estimate of the communication channel, wherein the third bandwidth estimate is determined based at least in part on the indication of the quantization parameter and on the second bit rate.

6. The method of claim 4, further comprising:
after determining the second bandwidth estimate, determining a third value of the network condition of the communication channel;
determining a third average value of the network condition over the first time period;
determining that the third value deviates from the third average value by greater than the first threshold percentage, wherein the first threshold percentage indicates a first amount by which it is permissible for the network condition to vary from the third average value over the first time period;
determining a fourth average value of the network condition over the second time period, wherein the second time period is longer than the first time period;
determining that the third value deviates from the fourth average value by less than or equal to the second threshold percentage, wherein the second threshold percentage indicates a second amount by which it is permissible for the network condition to vary from the fourth average value over the first time period; and
modifying the second bandwidth estimate by less than or equal to 25%.

7. The method of claim 4, further comprising:
after determining the second bandwidth estimate, determining a third value of the network condition of the communication channel;
determining a third average value of the network condition over the first time period;
determining that the third value deviates from the third average value by greater than the first threshold percentage, wherein the first threshold percentage indicates a first amount by which it is permissible for the network condition to vary from the third average value over the first time period;
determining a fourth average value of the network condition over the second time period, wherein the second time period is longer than the first time period;
determining that the third value deviates from the fourth average value by greater than the second threshold percentage, wherein the second threshold percentage indicates a second amount by which it is permissible for the network condition to vary from the fourth average value over the first time period; and
modifying the second bandwidth estimate by greater than or equal to 25%.

8. The method of claim 4, further comprising:
determining a third value of the network condition of the communication channel over a third time period following the second time period;
determining that the third value deviates from the first average value by less than the first threshold percentage;
determining a number of frame drops of the video stream over the third time period;
determining that the number of frame drops of the video stream over the third time period exceeds a frame drop threshold, wherein the frame drop threshold is an indicator that a capacity of the communication channel is exceeded by a current bit rate of the video stream; and
determining a third bandwidth estimate of the communication channel, wherein the third bandwidth estimate is less than the second bandwidth estimate.

9. The method of claim 4, further comprising:
receiving, at a third time period, the video stream at the first bit rate;
determining a third bandwidth estimate of the communication channel;
determining that the third bandwidth estimate is greater than the first bit rate;
determining that the first bit rate is less than a second percentage of a maximum bit rate of an encoder encoding the video stream;
generating a fourth bandwidth estimate by increasing the third bandwidth estimate by a third percentage, wherein the third percentage is determined using a first function associated with increasing bit rates less than the second percentage of the maximum bit rate of the encoder encoding the video stream;
receiving, at a fourth time period, the video stream at a second bit rate higher than the first bit rate;
determining that the fourth bandwidth estimate is greater than the second bit rate;
determining that the second bit rate is greater than the second percentage of the maximum bit rate of the encoder encoding the video stream; and
generating a fifth bandwidth estimate by increasing the fourth bandwidth estimate by a fourth percentage, wherein the fourth percentage is less than the third percentage, and wherein the fourth percentage is determined using a second function associated with increasing bit rates that are greater than the second percentage of the maximum bit rate of the encoder encoding the video stream.

10. The method of claim 4, further comprising:
after determining the first bandwidth estimate, sending a first receiver estimated maximum bit rate (REMB) message to a computing device encoding the video stream, wherein the first REMB message indicates a second bit rate at which to encode the video stream, the second bit rate corresponding to the first bandwidth estimate; and
after determining the second bandwidth estimate, sending a second REMB message to the computing device, wherein the second REMB message indicates a third bit rate at which to encode the video stream, the third bit rate corresponding to the second bandwidth estimate.

11. A computing device, comprising:
at least one processor; and
a non-transitory, computer-readable memory storing instructions that, when executed by the at least one processor are effective to program the at least one processor to:
receive a video stream at a first bit rate over a communication channel;
determine a first value of a network condition of the communication channel;
determine a first average value of the network condition over a first time period;
determine that the first value deviates from the first average value by greater than a first threshold percentage, wherein the first threshold percentage indicates a percentage by which it is permissible for the network condition to vary from the first average value over the first time period;
determine a first bandwidth estimate of the communication channel, wherein the first bandwidth estimate comprises the first bit rate reduced by a first percentage;
determine a second value of the network condition of the communication channel;

determine a second average value of the network condition over a second time period, wherein the second time period is greater than the first time period;

determine that the second value deviates from the second average value by greater than a second threshold percentage, wherein the second threshold percentage indicates a second percentage by which it is permissible for the network condition to vary from the second average value over the second time period; and determine a second bandwidth estimate of the communication channel, wherein the second bandwidth estimate is less than the first bandwidth estimate.

12. The computing device of claim 11, wherein the instructions, when executed by the at least one processor are further effective to program the at least one processor to:

receive an indication of a quantization parameter at which a first portion of the video stream was encoded;

determine a second bit rate of the first portion of the video stream; and determine a third bandwidth estimate of the communication channel, wherein the third bandwidth estimate is determined based at least in part on the indication of the quantization parameter and on the second bit rate.

13. The computing device of claim 11, wherein the instructions, when executed by the at least one processor are further effective to program the at least one processor to:

after determining the second bandwidth estimate, determine a third value of the network condition of the communication channel;

determine a third average value of the network condition over the first time period;

determine that the third value deviates from the third average value by greater than the first threshold percentage, wherein the first threshold percentage indicates a first amount by which it is permissible for the network condition to vary from the third average value over the first time period;

determine a fourth average value of the network condition over the second time period, wherein the second time period is longer than the first time period;

determine that the third value deviates from the fourth average value by less than or equal to the second threshold percentage, wherein the second threshold percentage indicates a second amount by which it is permissible for the network condition to vary from the fourth average value over the first time period; and modify the second bandwidth estimate by less than or equal to 25%.

14. The computing device of claim 11, wherein the instructions, when executed by the at least one processor are further effective to program the at least one processor to:

after determining the second bandwidth estimate, determine a third value of the network condition of the communication channel;

determine a third average value of the network condition over the first time period;

determine that the third value deviates from the third average value by greater than the first threshold percentage, wherein the first threshold percentage indicates a first amount by which it is permissible for the network condition to vary from the third average value over the first time period;

determine a fourth average value of the network condition over the second time period, wherein the second time period is longer than the first time period;

determine that the third value deviates from the fourth average value by greater than the second threshold percentage, wherein the second threshold percentage indicates a second amount by which it is permissible for the network condition to vary from the fourth average value over the first time period; and modify the second bandwidth estimate by greater than or equal to 25%.

15. The computing device of claim 11, wherein the instructions, when executed by the at least one processor are further effective to program the at least one processor to:

determine a third value of the network condition of the communication channel over a third time period following the second time period;

determine that the third value deviates from the first average value by less than the first threshold percentage;

determine a number of frame drops of the video stream over the third time period;

determine that the number of frame drops of the video stream over the third time period exceeds a frame drop threshold, wherein the frame drop threshold is an indicator that a capacity of the communication channel is exceeded by a current bit rate of the video stream; and determine a third bandwidth estimate of the communication channel, wherein the third bandwidth estimate is less than the second bandwidth estimate.

16. The computing device of claim 11, wherein the instructions, when executed by the at least one processor are further effective to program the at least one processor to:

receive, at a third time period, the video stream at the first bit rate;

determine a third bandwidth estimate of the communication channel;

determine that the third bandwidth estimate is greater than the first bit rate;

determine that the first bit rate is less than a second percentage of a maximum bit rate of an encoder encoding the video stream;

generate a fourth bandwidth estimate by increasing the third bandwidth estimate by a third percentage, wherein the third percentage is determined using a first function associated with increasing bit rates less than the second percentage of the maximum bit rate of the encoder encoding the video stream;

receive, at a fourth time period, the video stream at a second bit rate higher than the first bit rate;

determine that the fourth bandwidth estimate is greater than the second bit rate;

determine that the second bit rate is greater than the second percentage of the maximum bit rate of the encoder encoding the video stream; and generate a fifth bandwidth estimate by increasing the fourth bandwidth estimate by a fourth percentage, wherein the fourth percentage is less than the third percentage, and wherein the fourth percentage is determined using a second function associated with increasing bit rates that are greater than the second percentage of the maximum bit rate of the encoder encoding the video stream.

17. The computing device of claim 11, wherein the instructions, when executed by the at least one processor are further effective to program the at least one processor to:

after determining the first bandwidth estimate, send a first receiver estimated maximum bit rate (REMB) message to a computing device encoding the video stream, wherein the first REMB message indicates a second bit rate at which to encode the video stream, the second bit rate corresponding to the first bandwidth estimate; and after determining the second bandwidth estimate, send a second REMB message to the computing device, wherein the second REMB message indicates a third bit rate at which to encode the video stream, the third bit rate corresponding to the second bandwidth estimate.

18. The computing device of claim 11, wherein to determine the second bandwidth estimate the at least one processor is further effective to reduce a current bandwidth estimate by greater than 10%.

19. The method of claim 4, further comprising:
determining a first plurality of values of the network condition of the communication channel over the first time period;
determining the first average value of the first plurality of values of the network condition over the first time period;
determining a second plurality of values of the network condition of the communication channel over the second time period; and
determining the second average value of the second plurality of values of the network condition over the second time period.

* * * * *